(12) United States Patent
Kelly et al.

(10) Patent No.: US 12,184,717 B2
(45) Date of Patent: Dec. 31, 2024

(54) SYSTEM AND METHOD FOR EDGE ANALYTICS IN A VIRTUAL DESKTOP ENVIRONMENT

(71) Applicant: Dell Products L.P., Round Rock, TX (US)

(72) Inventors: John Kelly, Mallow (IE); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 17/360,236

(22) Filed: Jun. 28, 2021

(65) Prior Publication Data

US 2022/0417319 A1     Dec. 29, 2022

(51) Int. Cl.
```
H04L 29/08      (2006.01)
G06F 9/451      (2018.01)
H04L 67/10      (2022.01)
H04L 67/141     (2022.01)
```

(52) U.S. Cl.
CPC .............. *H04L 67/10* (2013.01); *G06F 9/452* (2018.02); *H04L 67/141* (2013.01)

(58) Field of Classification Search
CPC ........ H04L 67/10; H04L 67/141; G06F 9/452
See application file for complete search history.

(56) References Cited

U.S. PATENT DOCUMENTS

| | | | | |
|---|---|---|---|---|
| 9,503,527 B1* | 11/2016 | O'Sullivan | ........... | H04L 67/141 |
| 11,228,878 B1* | 1/2022 | Paran | ..................... | H04N 7/181 |
| 2004/0125923 A1* | 7/2004 | See | ..................... | H04L 41/0893 |
| | | | | 379/88.17 |
| 2008/0165764 A1* | 7/2008 | Mutikainen | ......... | H04L 65/1095 |
| | | | | 370/352 |
| 2010/0146142 A1* | 6/2010 | Long | ................... | H04L 65/1094 |
| | | | | 709/231 |
| 2011/0144517 A1* | 6/2011 | Cervantes | ................ | A61B 5/08 |
| | | | | 600/538 |
| 2011/0225578 A1* | 9/2011 | Lauwers | ............... | G06F 3/0484 |
| | | | | 717/176 |
| 2012/0317295 A1* | 12/2012 | Baird | .................... | H04L 67/131 |
| | | | | 709/228 |
| 2012/0331406 A1* | 12/2012 | Baird | ..................... | G06F 16/95 |
| | | | | 715/760 |
| 2014/0330798 A1* | 11/2014 | Li | .......................... | H04L 67/08 |
| | | | | 707/693 |

(Continued)

*Primary Examiner* — Atta Khan
*Assistant Examiner* — Wuji Chen
(74) *Attorney, Agent, or Firm* — Chamberlain, Hrdlicka, White, Williams & Aughtry; Aly Z. Dossa (57) ABSTRACT

An edge device for distributed processing of unprocessed edge data from any number of edge data collection devices using an analytics framework includes a storage device for storing the unprocessed edge data; and a processor. The processor obtains the unprocessed edge data from an edge data collection device of the edge data collection devices; identifying a processing modality for the unprocessed edge data; processing the unprocessed edge data based on the processing modality using, at least in part, a virtualized desktop infrastructure connection between the edge device and a backend device operably connected to the analytics framework to obtain a processed edge data result; and providing a computer implemented service using the processed edge data result.

14 Claims, 9 Drawing Sheets

(56) References Cited

U.S. PATENT DOCUMENTS

| | | | | |
|---|---|---|---|---|
| 2015/0007173 A1* | 1/2015 | Ionescu | ............... | G06F 9/45533 |
| | | | | 718/1 |
| 2015/0169206 A1* | 6/2015 | Balakrishnan | ...... | G06F 3/04842 |
| | | | | 715/740 |
| 2016/0112285 A1* | 4/2016 | Kim | ..................... | H04L 41/069 |
| | | | | 709/224 |
| 2016/0112528 A1* | 4/2016 | Chen | ..................... | G06F 9/452 |
| | | | | 709/203 |
| 2017/0003995 A1* | 1/2017 | Hu | ..................... | G06F 9/45558 |
| 2017/0185361 A1* | 6/2017 | Matsuda | ............... | G06F 1/1671 |
| 2018/0300124 A1* | 10/2018 | Malladi | ................ | H04L 67/561 |
| 2019/0068478 A1* | 2/2019 | Salinas | ............... | G06F 11/3068 |
| 2020/0153752 A1* | 5/2020 | Chan | .................... | G06F 16/958 |
| 2020/0186532 A1* | 6/2020 | Dynkin | ................... | G06F 21/57 |
| 2020/0351380 A1* | 11/2020 | Fedorov | .................. | H04W 4/70 |
| 2021/0144517 A1* | 5/2021 | Guim Bernat | ........ | H04L 9/0637 |
| 2021/0174952 A1* | 6/2021 | Leong | .................... | G16H 50/20 |
| 2021/0326128 A1* | 10/2021 | Malladi | ..................... | G06F 8/70 |
| 2022/0014579 A1* | 1/2022 | Bachmutsky | ............ | H04L 65/61 |
| 2022/0244969 A1* | 8/2022 | Vajravel | .................... | G06N 5/04 |
| 2022/0368622 A1* | 11/2022 | Rosenberg | ............. | H04L 45/14 |
| 2022/0414026 A1* | 12/2022 | Iyer | ....................... | G06F 21/554 |
| 2022/0417319 A1* | 12/2022 | Kelly | .................... | H04L 67/141 |
| 2023/0007839 A1* | 1/2023 | Karthikeyan | ......... | H04L 41/046 |

* cited by examiner

SYSTEM AND METHOD FOR EDGE ANALYTICS IN A VIRTUAL DESKTOP ENVIRONMENT

BACKGROUND

Data within a distributed system may be collected and processed. Different devices within the distributed system may be better able to process the collected data. To process the collected data, data may be transmitted between different devices of the distributed system.

SUMMARY

In one aspect, an edge device for distributed processing of unprocessed edge data from any number of edge data collection devices using an analytics framework in accordance with one or more embodiments of the invention includes a storage device for storing the unprocessed edge data; and a processor. The processor obtains the unprocessed edge data from an edge data collection device of the edge data collection devices; identifying a processing modality for the unprocessed edge data; processing the unprocessed edge data based on the processing modality using, at least in part, a virtualized desktop infrastructure connection between the edge device and a backend device operably connected to the analytics framework to obtain a processed edge data result; and providing a computer implemented service using the processed edge data result.

In one aspect, a method for distributed processing of unprocessed edge data from any number of edge data collection devices using an analytics framework in accordance with one or more embodiments of the invention includes obtaining the unprocessed edge data from an edge data collection device of the edge data collection devices; identifying a processing modality for the unprocessed edge data; processing the unprocessed edge data based on the processing modality using, at least in part, a virtualized desktop infrastructure connection between an edge device and a backend device operably connected to the analytics framework to obtain a processed edge data result; and providing a computer implemented service using the processed edge data result.

In one aspect, a non-transitory computer readable medium in accordance with one or more embodiments of the invention includes computer readable program code, which when executed by a computer processor enables the computer processor to perform a method for distributed processing of unprocessed edge data from any number of edge data collection devices using an analytics framework. The method includes obtaining the unprocessed edge data from an edge data collection device of the edge data collection devices; identifying a processing modality for the unprocessed edge data; processing the unprocessed edge data based on the processing modality using, at least in part, a virtualized desktop infrastructure connection between an edge device and a backend device operably connected to the analytics framework to obtain a processed edge data result; and providing a computer implemented service using the processed edge data result.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5.1-5.4 show diagrams of the operation of a system similar to that of FIG. 1 over time in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for distributed processing of data from edge devices. In a computing environment, edge devices may collect data regarding a local environment via any number of edge data collection devices (e.g., such as sensors). However, the edge devices may not have sufficient computing resources (e.g., hardware and/or software components) to process all, or a portion, of the collected data.

To process the collected data, backend devices with significant processing capabilities may be collocated with analytic frameworks that are able to orchestrate and/or process the data. These backend devices and analytic frameworks may be remote to the edge devices necessitating the transmission of the collected data across the distributed system for processing.

Due to security requirements or limited resource availability in relation to the edge devices, it may be disadvantageous to open additional connections between the edge devices and the backend devices/analytic frameworks. For example, the edge devices may be implemented with sufficient computing resources to access virtualized desktop infrastructure (VDI) but may otherwise lack resources for performing other functions. Consequently, opening additional connection and/or managing the distribution and processing of data may place an undesirable load on the edge devices or create an undesirable security posture in relation to the edge devices.

To facilitate distribution of the collected data and orchestrate processing of the distributed data, the system may repurpose existing connections between the edge device and backend devices for other purposes. Specifically, one or more existing connections may be repurposed from providing VDI functionality to providing data transmission functionality.

For example, the edge device may establish a virtual channel within an existing VDI connection for data transmission purposes. By doing so, the edge device may transmit and/or orchestrate processing of collected data by backend devices and/or analytic frameworks without incurring additional computational overhead (e.g., for the purpose of establishing additional data transmission connections).

Consequently, a system in accordance with embodiments of the invention may more efficiently marshal limited computing resources for processing data in a distributed environment. By doing so, unprocessed edge data may be more quickly and/or efficiently processed.

The results of the aforementioned distributed data processing may be used the system to provide computer implemented services to users of the system. For example, the results of the distributed data processing may be matched to one or more actions thereby driving the interaction between the users and the system.

Figure 1:
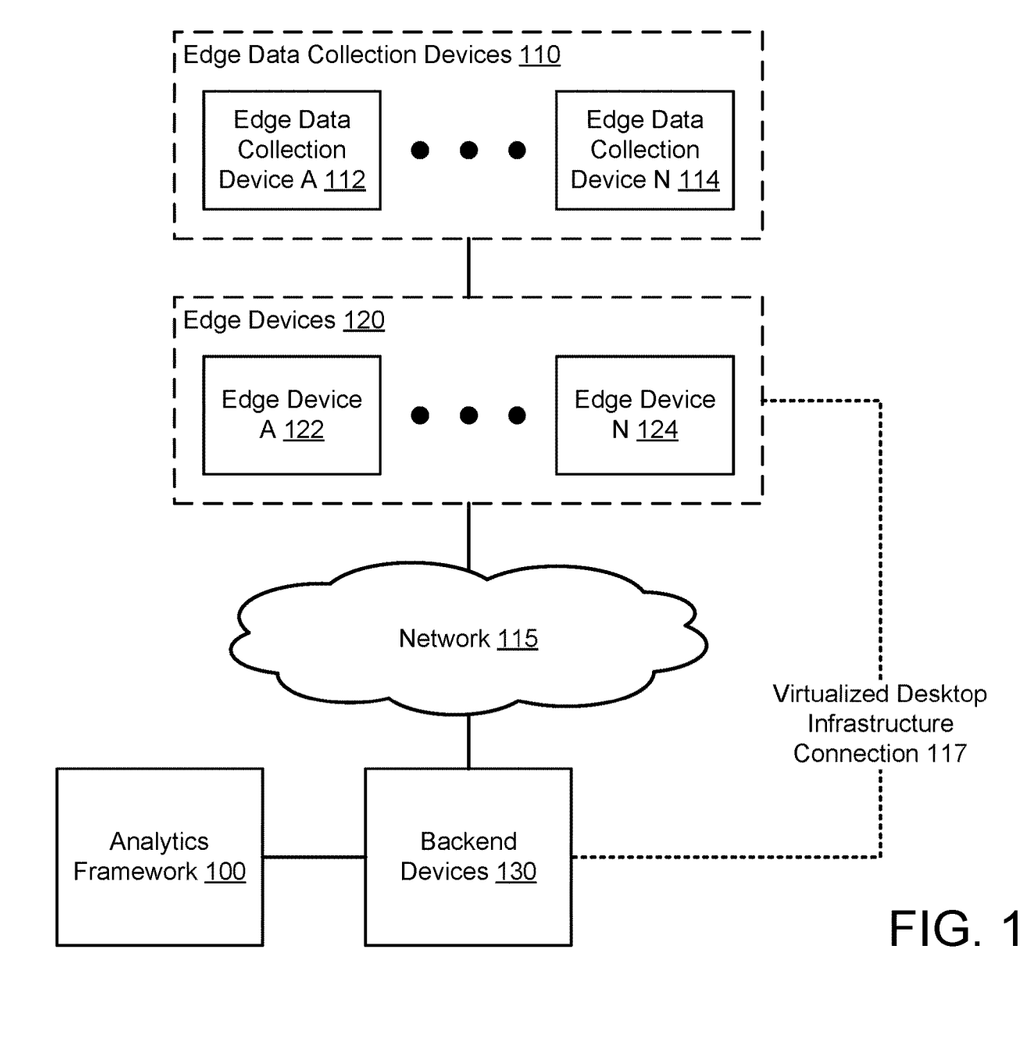
FIG. 1 shows a diagram of a system in accordance with one or more embodiments of the invention.

Turning to FIG. 1, FIG. 1 shows a system in accordance with one or more embodiments of the invention. The system of FIG. 1 may provide computer implemented services to users. To provide the computer implemented services to the users, the system of FIG. 1 may perform data collection and distributed processing of the collected data.

For example, the system of FIG. 1 may implement an edge and core computation environment in which edge devices (120) may be geographically distributed proximately to where data is to be collected and core devices (e.g., back end devices (130), analytics frameworks, etc., which may be remote to the edge devices) provide significant processing capacity for the collected data. By doing so, the system may improve the efficiency of use of computing resources by centralizing the majority of the processing resources which may be shared across the system for the performance of computations.

To provide the aforementioned computer implemented services, the system of FIG. 1 may include any number of edge collection devices (110). The edge collection devices (110) collect data from any number of sources. Different edge collection devices (110) may collect different types of data form different sources. For example, different edge collection devices (e.g., 112, 114) may be implemented as embedded systems that include sensors that collect data from corresponding sources upon which computations may be performed.

The edge collection devices (110) may collect any type and quantity of data. For example, the edge collection devices (110) may be integrated into industrial environments to collect information regarding ongoing processes (e.g., temperatures, energy use, production rates, etc.) or other types of environments (e.g., oil field locations, factories, commercial businesses, homes, etc.).

The edge collection devices (110) may provide the collected data to one or more edge devices (120) that may aggregate the collected data and/or orchestrate processing of the collected data. An edge device may be a computing device that may be capable of storing, transmitting, and processing data. The edge devices (120) may be operably connected to the backed devices (130) via a network (e.g., the Internet).

In one or more embodiments of the invention, the edge devices (110) are implemented as portable devices. For example, the edge devices (110) may be implemented using laptop computer, tablets, personal computing devices, cellular phones, etc.

By being portable, the edge devices (120) may not always be able to obtain data from the edge data collection devices (110). For example, the edge data collection devices (110) may communicate with the edge devices (120) via wireless connections that have a limited range or via a wired network to which the edge devices (120) may not always be connected. Thus, if moved away from some or all of the edge data collection devices (110), then the edge devices may be unable to obtain data form the edge data collection devices (110).

To utilize the data collected from the edge data collection devices (110), the data may need to be processed. However, the edge devices (120) may not include the type and/or quantity of computing resources necessary to perform the processing in a desirable manner (e.g., processing by the edge devices may take too long). For example, to be made portable, the edge devices (120) may include a limited quantity of computing resources (e.g., limited number of processors, memory modules, storage devices, etc.).

To process the data collected by the edge data collection devices (110), the edge devices (120) may cooperate with the backend devices (130) and/or an analytics framework (100). Specifically, the edge devices (120) may distribute all, or a portion, of the data for distributed processing among any of these entities.

Because these entities may be remote to one another, these entities may need to communicate with one another via a network (e.g., 115) to distribute the data and/or otherwise coordinate to complete the computations. However, doing so may be problematic because it may require that the edge devices (120) open additional connections, dedicate additional computing resources for data distribution, and/or may subject to the data to potential loss or improper disclosure to their parties.

In general, embodiments of the invention relate to systems, devices, and methods for processing collected data in a distributed system. Specifically, embodiments of the invention may provide a method for securing processing of data in a distributed system. To do so, the edge devices (120) of FIG. 1 may implement virtualized desktop infrastructure (VDI) or other types of computing environments that enable remote resources (e.g., backend devices (130)) to provide services in a manner that appear to be provided by the edge devices (120). For example, the edge devices (120) may collect user input, correlate the collected user input to functionalities of computer implemented services to be provided to the users, communicate with backend devices (130) that perform computations necessary to provide the functionalities of the computer implemented services, and use the computations performed by the back end devices (130) to provide the computer implemented services in a manner that appears (to the user) to be performed locally to the user.

Additionally, the edge devices (120) of FIG. 1 may utilize network connectivity established by the VDI to perform distributed computation of collected data using the backend devices (130) and/or analytics frameworks (e.g., 100). When the VDI is established, it may setup any number of VDI connections (e.g., 117) for the purposes of performing various functionalities of the VDI. For example, the VDI may establish a connection (e.g., a connection supporting a display protocol) over which graphics interfaces are transmitted (e.g., generated by backend devices and displayed be an edge device).

The edge devices (120) may, at least temporarily, repurpose these connections to distribute collected data and manage processing of the distributed data. By doing so, when an edge device collects data, it may distribute it for processing without needing to establish additional connections which may otherwise increase a workload on the edge device. Thus, the system of FIG. 1 may provide a computing environment that is able to process data more efficiently in a distributed manner by avoiding the overhead associated with data distribution and/or command and control via separate connections. For additional details regarding edge devices (120), refer to FIG. 2.

The system of FIG. 1 may process the collected data to provide computer implemented services to users of any of the devices illustrated in FIG. 1 and/or other devices (not shown). For example, the system of FIG. 1 may perform various actions based on the result of processing the collected data. These actions may include, for example, collecting additional data, modifying the operation of one or more other devices (e.g., components of a manufacturing or industrial environment), displaying information to users, etc.

To process the collected data, the analytics framework (100) may implement any number of data processing techniques and/or may coordinate with other entities (e.g., backend devices (130), edge devices (120), etc.) to process the collected data. These processing techniques may depend on the type of data that is collected by the edge data collection devices (110) and/or the goals for which the processing is being performed.

To coordinate with the other entities, the analytics framework (100) may instruct or otherwise indicate to other entities how to process data, how to aggregate the results of the processing, and/or how to utilize the results of the processing to provide desired computer implemented services.

The backend devices (130) may facilitate the VDI functionalities of the edge devices (120). For example, the backend devices (130) may perform computations on behalf of the VDI implemented by the edge devices (120) and provide the results of the computations to the edge devices (120). By doing so, the edge device (120) may be able to provide functionalities that would otherwise be unavailable due to the lack of computing resources and/or software implemented functionalities of the edge devices (120).

The system of FIG. 1 may include any number of edge data collection devices (110), edge devices (120), backend devices (130), and/or analytic frameworks (e.g., 100). Any of the components of FIG. 1 may be operably connected to any other component and/or other components not illustrated in FIG. 1 via one or more networks (e.g., 115). The networks (e.g., 115) may be implemented using any combination of wired and/or wireless network topologies. The networks (e.g., 115) may employ any number and types of communication schemes to enable the edge data collection devices (110), edge devices (120), backend devices (130), and/or analytic frameworks (e.g., 100) to communicate with each other.

The edge data collection devices (110), edge devices (120), backend devices (130), and/or analytic frameworks (e.g., 100) may be implemented using computing devices. The computing devices may include, for example, a server, laptop computer, a desktop computer, a node of a distributed system, etc. (e.g., one or more being part of an information handling system). The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the edge data collection devices (110), edge devices (120), backend devices (130), and/or analytic frameworks (e.g., 100) described in this application and/or all, or a portion, of the methods illustrated in FIGS. 3-4. The edge data collection devices (110), edge devices (120), backend devices (130), and/or analytic frameworks (e.g., 100) may be implemented using other types of computing devices without departing from the invention. For additional details regarding computing devices, refer to FIG. 6.

While the system of FIG. 1 has been illustrated and described as including a limited number of specific components, a system in accordance with embodiments of the invention may include additional, fewer, and/or different components without departing from the invention.

Figure 2:
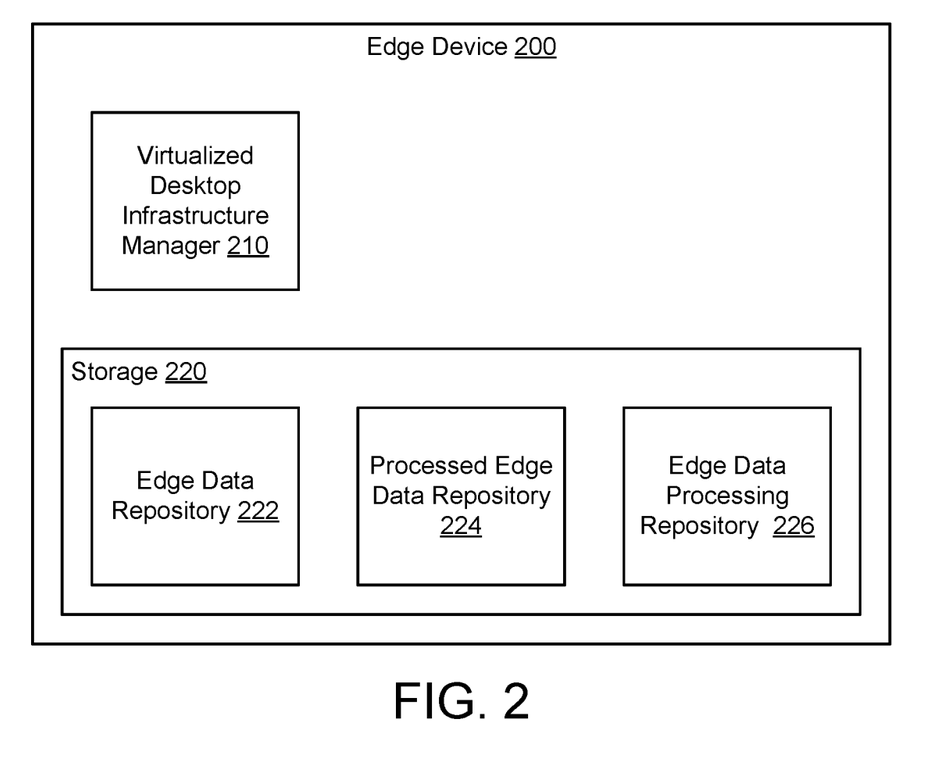
FIG. 2 shows a diagram of an edge device in accordance with one or more embodiments of the invention.

Turning to FIG. 2, FIG. 2 shows a diagram of an edge device (200) in accordance with one or more embodiments of the invention. The system of FIG. 1 may include any number of edge devices (e.g., 120) similar to the edge device (200) illustrated in FIG. 2. The edge device (200) may manage the collection and distributed processing of the collected data by the system illustrated in FIG. 1.

To manage the collection and process of data provided by the system of FIG. 1, the edge device (200) may include a virtualized desktop infrastructure manager (210) and storage (220). Each of these components is discussed below.

The virtualized desktop infrastructure manager (210) may manage the collection and distributed processing of data within the system of FIG. 1. To do so, the virtualized desktop infrastructure manager (210) may (i) provide VDI functionality in cooperation with backend devices that perform computations on behalf of the edge devices (200) for VDI purposes, (ii) establish collections for VDI purposes, (iii) collect data from edge data collection devices, (ii) repurpose the connections used for VDI purposes to manage distributed processing of collected data, and (iv) provide computer implemented services using the results of the distributed computations.

For example, consider a scenario where an edge device is implemented as a tablet computer. The tablet computer may have limited computing resources preventing it from substantively processing data. However, the tablet may implement VDI which allows it to perform substantive data processing using the computing resources of other devices.

To facilitate processing of data, the tablet may be brought within wireless communication range of edge data collection devices at a power station. Once in range, the tablet may obtain copies of data that the edge data collection devices collected.

Rather than establishing a new connection to distribute the obtained data for processing purposes, the tablet may repurpose a graphics protocol connection to transmit copies of the obtained data to a backend device. For example, the virtualized desktop infrastructure manager (210) may establish a virtual channel using the graphics protocol connection (e.g., as a sub-channel or otherwise transmit data to the backend devices via the graphics protocol connection for non-graphics purposes). In turn, the backend device may distribute copies of the obtained data to an analytic framework for processing.

Once processed, the analytic framework may send results of processing the obtained data to the backend devices. In turn, the backend device may send, via the display protocol connection (e.g., via the virtual channel), a copy of the results to the tablet.

Thus, via the above process, the virtualized desktop infrastructure manager (210) may manage the distributed processing of the collected data without needing to establish other connections or otherwise increase the computational overhead on the tablet.

When sending data via the virtual channel, the virtualized desktop infrastructure (210) may encapsulate, apply identifiers, or may otherwise indicate to the backend device that some data sent over the graphics protocol connection (or another connection used for other VDI purposes) is to be used for other purposes (i.e., for distributed data processing). By doing so, the VDI connection between the edge device (200) and a backend device may be repurposed to transmit data for purposes other than VDI.

Figure 3:
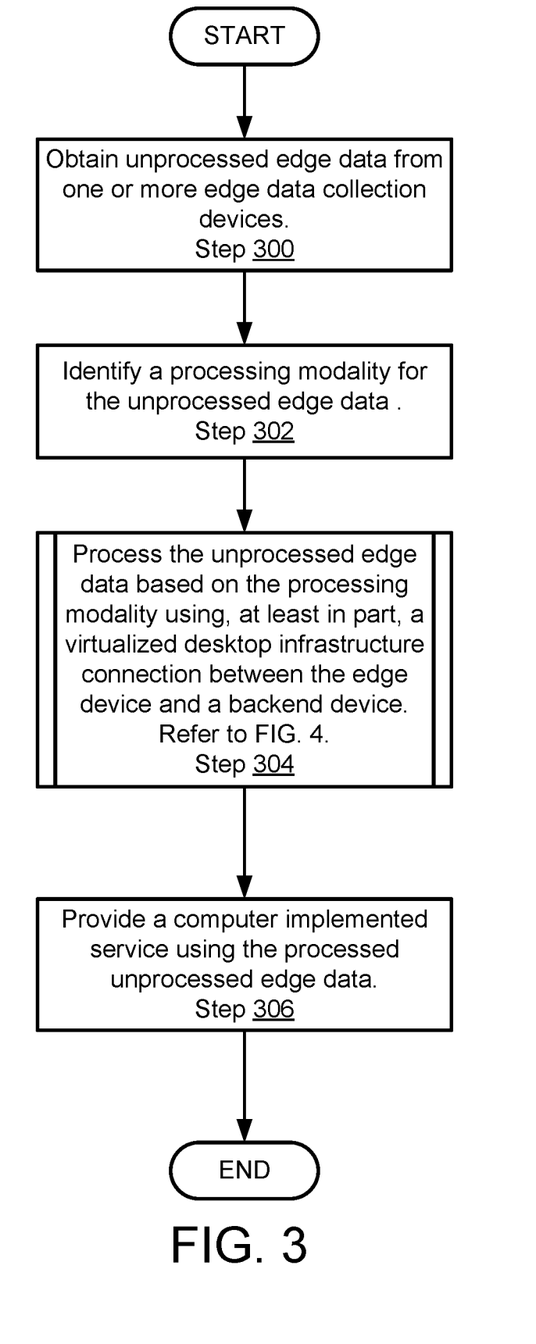
FIG. 3 shows a flowchart of a method of processing data in a distributed environment in accordance with one or more embodiments of the invention.
Figure 4:
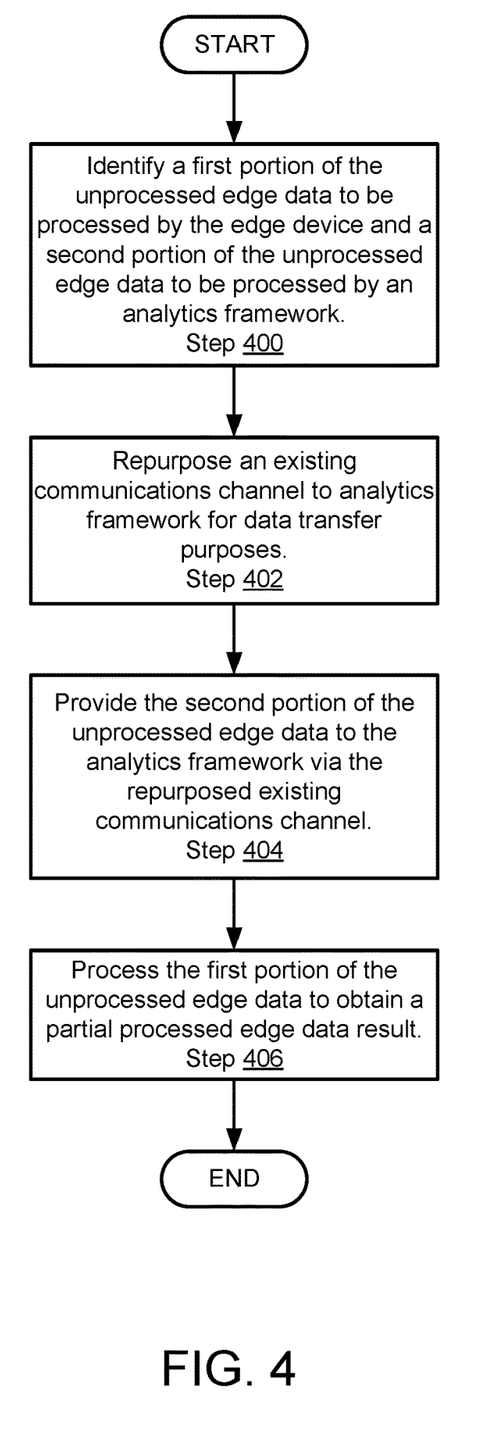
FIG. 4 shows a flowchart of a method of orchestrating the distribution and distributed processing of data in accordance with one or more embodiments of the invention.

When providing its functionality, the virtualized desktop infrastructure manager (210) may perform all, or a portion, of the methods illustrated in FIGS. 3-4.

In one or more embodiments of the invention, the virtualized desktop infrastructure manager (210) is implemented using a hardware device including circuitry. The hardware device may be, for example, a digital signal processor, a field programmable gate array, or an application specific integrated circuit. The circuitry may be adapted to cause the hardware device to perform the functionality of the virtualized desktop infrastructure manager (210). The virtualized desktop infrastructure manager (210) may be implemented using other types of hardware devices without departing from the invention.

In one or more embodiments of the invention, the virtualized desktop infrastructure manager (210) is implemented using a processor adapted to execute computing code stored on a persistent storage that when executed by the processor performs the functionality of the virtualized desktop infrastructure manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified/created) to perform the function. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, an edge data repository (222), a processed edge data repository (224), and an edge data processing repository (224). Each of these data structures is discussed below.

The edge data repository (222) may be implemented using one or more data structures that includes information regarding data collected by edge data collection devices. For example, when the edge device (200) is in proximity to edge data collection devices, it may obtain copies of data (e.g., sensor data, other types of data) collected by the edge data collection devices. The copies of the data and/or data regarding the copies (and/or the process of obtaining the data) may be stored in the edge data repository (222)

The edge data repository (222) may be maintained by, for example, the virtualized desktop infrastructure manager (210). For example, the virtualized desktop infrastructure manager (210) may add, remove, and/or modify information included in the edge data repository (222). The virtualized desktop infrastructure manager (210) may do so based on data obtained from edge data collection devices (and/or other devices that may be able to provide data that is to be processed based on an analytics framework).

The data structures of the edge data repository (222) may be implemented using, for example, lists, tables, unstructured data, databases, etc. While illustrated in FIG. 2 as being stored locally, the edge data repository (222) may be stored remotely and may be distributed across any number of devices without departing from the invention.

The processed edge data repository (224) may be implemented using one or more data structures that includes information regarding the process of data collected by edge data collection devices. When data is obtained from these collection devices, it may be processed in a distributed manner by the edge device (200), backend devices, and/or analytic frameworks. When results of such processing are obtained, the results may be stored in the processed edge data repository for future use.

The processing results may be subsequently used to provide computer implemented services. For example, the virtualized desktop infrastructure manager (210) may perform various action sets in response to obtaining corresponding results when processing the collected data. The actions sets may include any number and type of actions that may cause the edge device (200) to perform any number and type of computer implemented functionality.

The processed edge data repository (224) may be maintained by, for example, the virtualized desktop infrastructure manager (210). For example, the virtualized desktop infrastructure manager (210) may add, remove, and/or modify information included in the processed edge data repository (224). The aforementioned information may be obtained from the results of processing data from the edge data repository (222).

The data structures of the processed edge data repository (224) may be implemented using, for example, lists, tables, unstructured data, databases, etc. While illustrated in FIG. 2 as being stored locally, the processed edge data repository (224) may be stored remotely and may be distributed across any number of devices without departing from the invention.

The edge data processing repository (226) may be implemented using one or more data structures that includes information regarding how to process collected data. The edge data processing repository (226) may specify, for example: (i) which entities should process corresponding portions of collected data, (ii) how to process the respective portions of data, (iii) how to repurpose connections for distributed processing purposes, (iv) how to combine or otherwise utilize results, and/or (v) how to respond to the occurrence of certain processing results.

The actions may include action sets that are keyed to the occurrence of predetermined results of performing distributed computations. The actions may include, for example, collecting additional data, performing additional processing of existing or newly collected data, activating one or more functionalities, providing copies of the results to other entities (and/or notifying other entities of the existence of the results), invoking functionalities of other entities, and/or performing other actions that may allow for the system of FIG. 1 to provide computer implemented services to users of the system.

The edge data processing repository (226) may be maintained by, for example, the virtualized desktop infrastructure manager (210). For example, the virtualized desktop infrastructure manager (210) may add, remove, and/or modify information included in the edge data processing repository (226). The aforementioned information may be obtained from administrators, users, and/or other computing devices.

The data structures of the edge data processing repository (226) may be implemented using, for example, lists, tables, unstructured data, databases, etc. While illustrated in FIG. 2 as being stored locally, the edge data processing repository (226) may be stored remotely and may be distributed across any number of devices without departing from the invention.

While the storage (220) has been illustrated and described as including a limited quantity and type of data, a storage in accordance with embodiments of the invention may store additional, less, and/or different data without departing from the invention.

While the infrastructure manager (200) has been illustrated and described as including a limited number of specific components, an infrastructure manager in accordance with embodiments of the invention may include additional, fewer, and/or different components without departing from the invention.

As discussed above, the system of FIG. 1 may manage the distributed processing of data collected by any number of edge data collection devices. FIGS. 3-4 illustrate methods that may be performed by components of the system of FIG. 1 to manage the distributed computations.

FIG. 3 shows a flowchart of a method in accordance with one or more embodiments of the invention. The method depicted in FIG. 3 may be performed to process data in a distributed system in accordance with one or more embodiments of the invention. The method shown in FIG. 3 may be performed by, for example, an edge device (e.g., 120, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, unprocessed edge data is obtained from one or more edge data collection devices.

In one or more embodiments of the invention, the unprocessed edge data is obtained via a connection between the edge device and the one or more edge data collection devices. For example, when the edge device is within range of the edge data collection devices, the edge device may establish a wireless connection with the respective edge data collection devices and receive copies of the unprocessed edge data from the respective edge data collection devices.

The edge data collection devices may not have access to computing resources to process the unprocessed data (and/or processing the unprocessed edge data may require aggregation of the unprocessed edge data). For example, the edge data collection devices may include only those resources necessary for operation of the respective edge data collection devices. The edge device may also not have sufficient computing resources to process all of the unprocessed edge data.

In step 302, a processing modality for the unprocessed edge data may be identified. The processing modality may specify which entities will process corresponding portions of the unprocessed edge data, how the portions of the processed edge data will be processed, and/or other information regarding how to process the unprocessed edge data.

The processing modality may be identified using an edge data processing repository. The edge data processing repository may include processing modalities corresponding to any number and types of unprocessed edge data.

In some embodiments of the invention, the edge data processing repository may include information usable to derive the processing modality. For example, the edge data processing repository may include a template that is to be completed by the edge device based on the computing resources of the edge device and other entities (e.g., backend devices and/or analytic framework) and/or other factors. For example, the template may indicate that the unprocessed edge data may be divided for processing proportionally based on the availability of computing resources by each of the aforementioned entities.

In step 304, the unprocessed edge data is processed based on the processing modality using, at least in part, a VDI connection between the edge device and a backend device.

In one or more embodiments of the invention, the unprocessed edge data is processed by distributing a portion of the unprocessed edge data for processing by the backend device via the VDI connection. For example, the edge device may temporarily repurpose the VDI connection for transmitting a copy of the portion of the unprocessed edge data to the backend device. To do so, a virtual channel within the VDI connection may be established. The virtual channel may be established by, for example, storing the portion of the unprocessed edge data in messages transmitted via the VDI connection in places within the messages that are meant for other purposes (e.g., for whatever purpose the VDI connection was established to perform such as graphics distribution, input device input transmission, etc.). Identifiers or other indicators that unprocessed edge data is included in the messages sent over the VDI connection may be included in the messages. For example, a flag may be set indicating that the messages sent over the VDI connection include data other than that for which the VDI connection was established.

The processing modality may specify the portion of the data to be processed by the backend device, the processing to be performed on the unprocessed edge data, and/or other information usable to enable the edge device, backend device, and/or other devices to process the unprocessed edge data.

Processing the unprocessed edge data may generate a result. The result may be of any type and quantity of data. Because different entities may process various portions of the unprocessed edge data, each of the entities may obtain a partial result by processing the respective portions of the unprocessed edge data.

To orchestrate processing of the various portions of the edge data, the edge device, backend device, analytics framework, and/or other entities may implement any command and control scheme such as, for example, message passing systems, publish subscribe systems, implicit control systems, explicit control systems, etc. Any of the entities of FIG. 1 (or those not illustrated in FIG. 1) may orchestrate the processing of the portion of unprocessed edge data without departing from the invention.

In one or more embodiments of the invention, the unprocessed edge data is processed via the method illustrated in FIG. 4.

In step 306, a computer implemented service is provided using the processed unprocessed edge data.

The computer implemented service may be any type of service providable using, at least in part, all or a portion of the processed unprocessed edge data. For example, the edge device may aggregate the various partial results of processing different portions of the unprocessed edge data. A complete result may then be obtained using the partial processing results.

In one or more embodiments of the invention, the computer implemented services may be provided by matching all, or a portion, of the complete results to actions to be performed using an edge data processing repository. The edge data processing repository may include actions to be performed that are keyed to such results.

The actions may include, for example, obtaining other partial results (e.g., other partially processed edge data results), obtaining other unprocessed edge data, combining the other partial results without previous results or other partial results generated by other entities, combining the various partial results to generate other complete results (e.g., complete processed edge data results), invoking various functionalities (e.g., data collection, data processing) of the edge device (and/or other edge devices), backend device, analytics framework, and/or other entities, and/or other actions may be useful to a user of the system of FIG. 1.

The method may end following step 306.

Using the method illustrated in FIG. 3, a system in accordance with embodiments of the invention may distribute the processing of edge data across numerous entities without needing to establish additional connections to orchestrate distribution and processing of the edge data. Consequently, the edge device may be better able to provide its functionality by avoiding unnecessary expenditure of computing resources.

Turning to FIG. 4, FIG. 4 shows a flowchart of a method in accordance with one or more embodiments of the invention. The method depicted in FIG. 4 may be performed to orchestrate distribution and distributed processing of unprocessed edge data in accordance with one or more embodiments of the invention. The method shown in FIG. 4 may be performed by, for example, an edge device (e.g., 120, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a first portion of unprocessed edge data to be processed by the edge device is identified and a second portion of the unprocessed edge data to be processed by an analytics framework is identified. The analytics framework may be operably connected to a backend device to which the edge device is also operably connected via a VDI connection.

The first portion and second portion may be identified using a processing modality (e.g., that identified in step 302 of FIG. 3). The processing modality may specify one or more rules, metrics, or other information usable to discriminate the portions from one another.

In one or more embodiments of the invention, the processing modality may take into account, for example, the computing resources likely required to process the unprocessed edge data, the available computing resources of the edge device, the available computing resources of the backend device, and/or the available computing resources of the analytics framework. The processing modality may specify rules that are based in part on these factors.

The first portion and the second portion may include any quantity of data. For example, either of these portions may be no data, all of the unprocessed edge data, and/or a portion thereof. Consequently, the edge device may perform some, none, or all of the processing. Similarly, the backend device and/or analytic framework may perform some, none, or all of the processing of the unprocessed edge data.

In step 402, an existing communications channel to the analytics framework is repurposed for data transfer purposes. The existing communications channel may have been previously instantiated for other purposes.

In one or more embodiments of the invention, the existing communications channel is a VDI connection between the edge device and backend device (which is also connected to the analytics framework; which may be hosted by the backend device or may be implemented as a separate device).

The existing communications channel may be repurposed by establishing a virtual data transfer channel using the existing communications channel. In doing so, existing communication channel may not be modified for communications standard purposes. However, the second portion of the data may be inserted in messages passed over the existing communications channel thereby providing a virtual channel even thought he existing communications channel may not have been established for data transfer and/or distributed processing orchestration purposes.

In step 404, the second portion of the unprocessed edge data is provided to the analytics framework via the repurposed existing communications channel. To do so, the second portion of the unprocessed data may be added to messages passed via the repurposed existing communications channel. The backend device may receive these messages, extract the second portion of the unprocessed edge data, and provide all, or a portion of the second portion to the analytics framework for processing. Consequently, the analytics framework (and/or the backend device) may generate a partial result based on the processing of the second portion of the unprocessed edge data.

In step 406, the first portion of the unprocessed edge data is processed to obtain a partial processed edge data result. The partial processed edge data result may be combined with other partial processed edge data results generated by other entities to obtain a complete processed edge data result.

The method may end following step 406.

Using the method illustrated in FIG. 4, data may be distributed and processed in a distributed without establishing additional communication channels. Consequently, the method may provide the results of distributed processing of data while incurrent little to no additional overhead by utilizing existing resources rather than establishing new resources for processing the data.

To further clarify embodiments of the invention, a non-limiting example is provided in FIGS. 5.1-5.4. These figures show diagrams of an example of a system similar to that of FIG. 1 over time. In the figures, the sequential actions performed by the respective components are highlighted in order from 1-7 (circled in these figures) and connected one another, sequentially, using dashed lines. Connections between the components are shown using short dashed and solid lines. Communications sent via these connections are shown using long dashed lines.

Example

Figure 51:
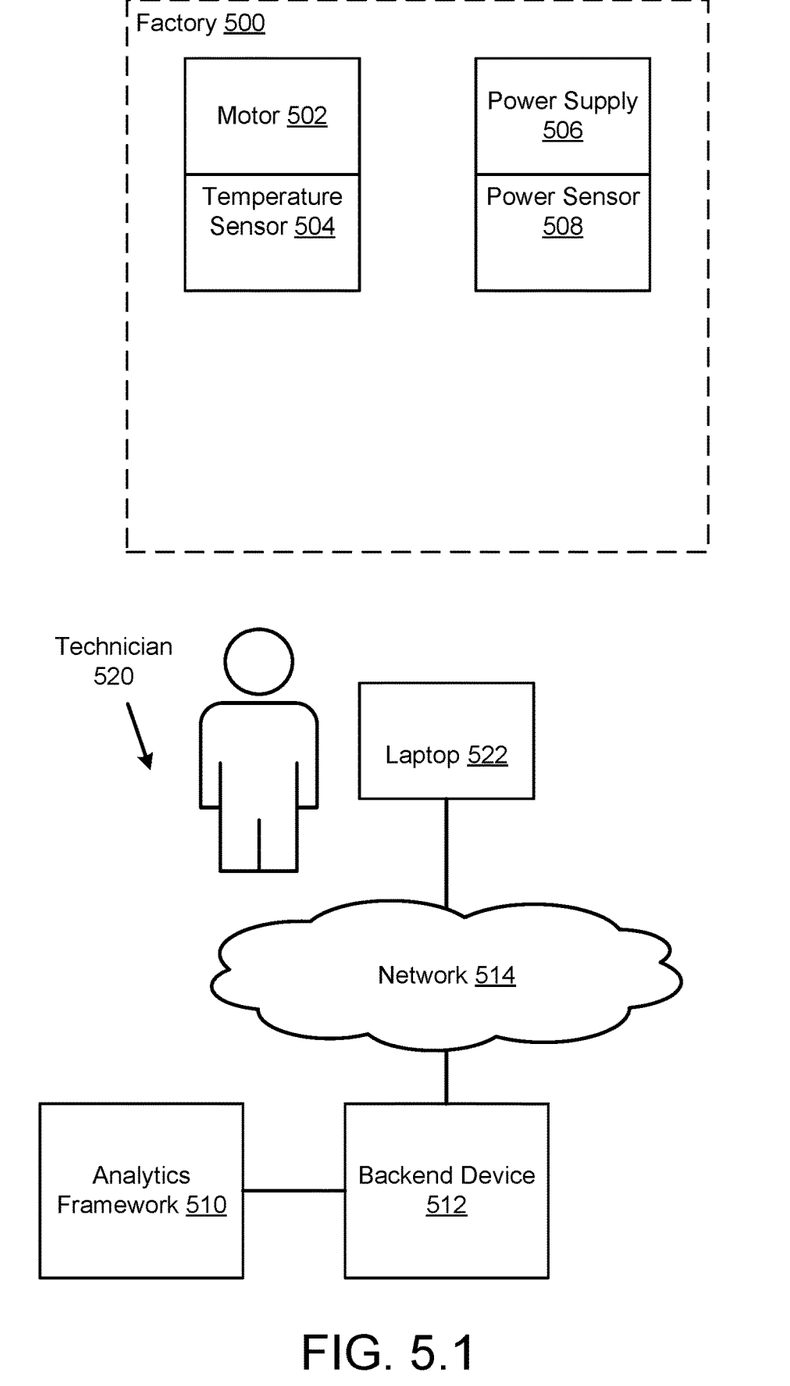

Consider a scenario as illustrated in FIG. 5.1 in which a business owns a factory (500) that produces products. To produce the products, the factory includes a motor (502) and a power supply (506) that powers the motor (502). The operation of these devices primarily determines the rate that the products are produced by the factory.

To monitor the productivity of the factory (500), the business has installed two edge data collection devices. The first is a temperature sensor (504) that is able to monitor the temperature of the motor (e.g., to check for overheating) and the second is a power sensor (508) that is able to monitor the power consumption of the motor (e.g., to verify expected operation of the motor).

These sensor produce large amounts of data and there are now edge devices on site that are able to process the data. To monitor the operation of its factories, the business employs a technician (520) that travels between its factories to check on their respective rates of production. The technician brings a laptop (522) which is an edge device that is not capable of processing all of the data produced by the sensor.

The laptop (522) hosts a VDI that is operably connected via a network (514) to a backend device (512) that assists in providing the VDI functionality. The backend device (512) is also operably connected to an analytics framework (510) that is able to appropriately process the data produced by the sensors (504, 508) to ascertain the operational state of the motor (502) over time thereby estimating the rate of production by the factor (500).

As seen in FIG. 5.1, the technician (520) and laptop (522) are not proximate to the factory (500) and, consequently, are unable to obtain unprocessed edge data from the sensors.

Figure 52:
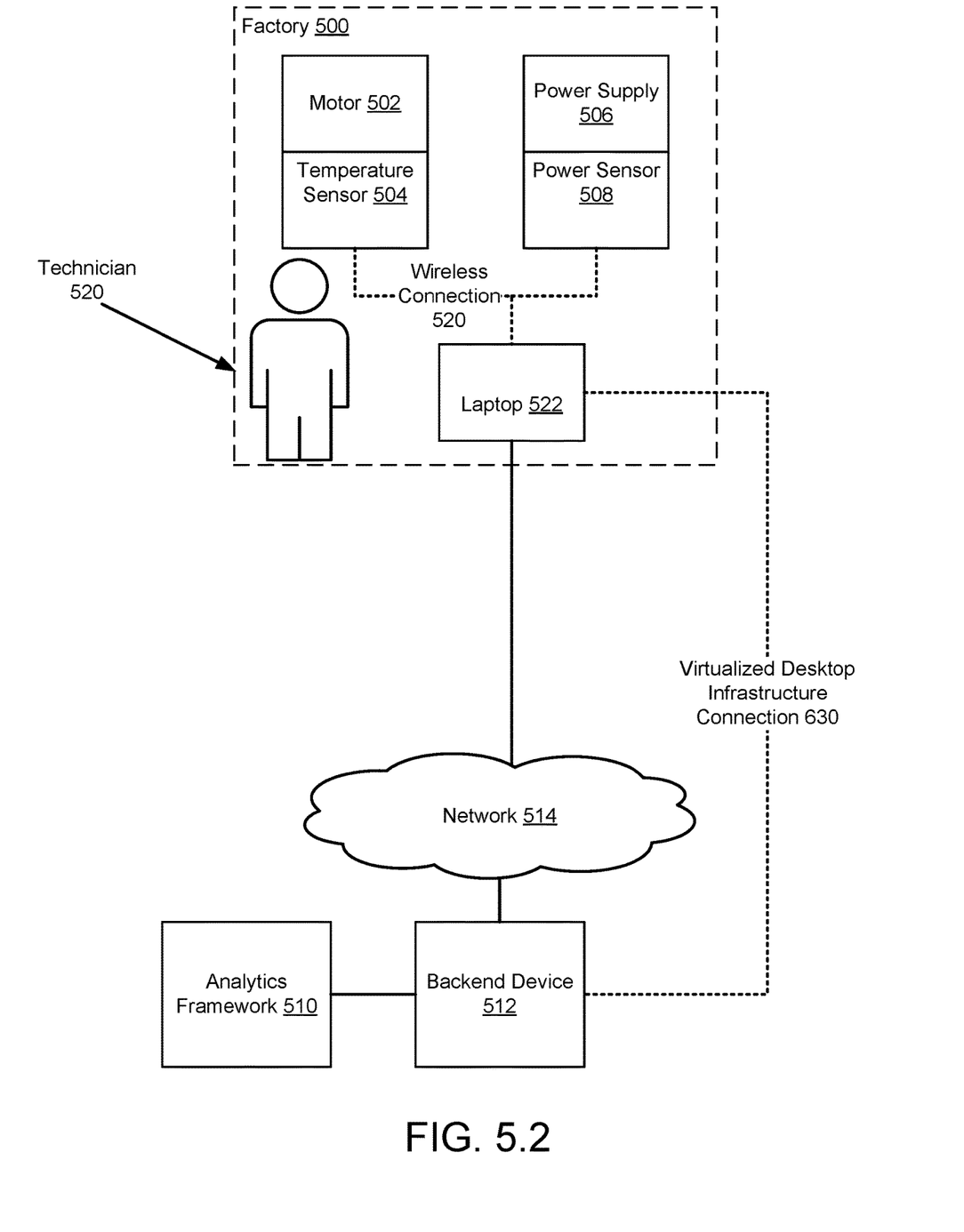

Turning to FIG. 5.2, in accordance with a schedule, the technician (520) travels to the factory (500). When at the factory, the laptop (522) operably connects to the sensors via a wireless connection (520) implemented by the laptop (522) and sensors (504, 508), respectively.

Figure 53:
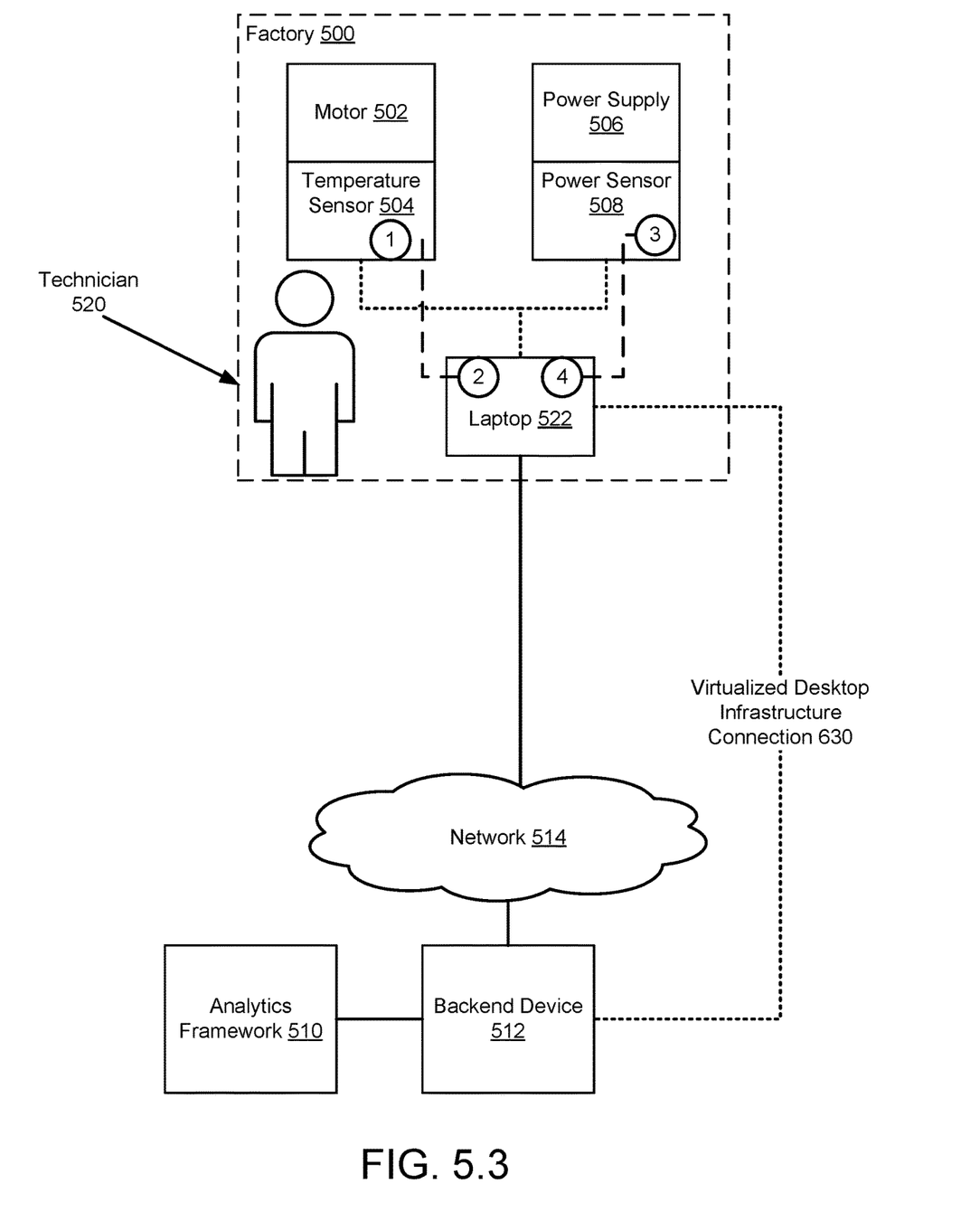
Figure 54:
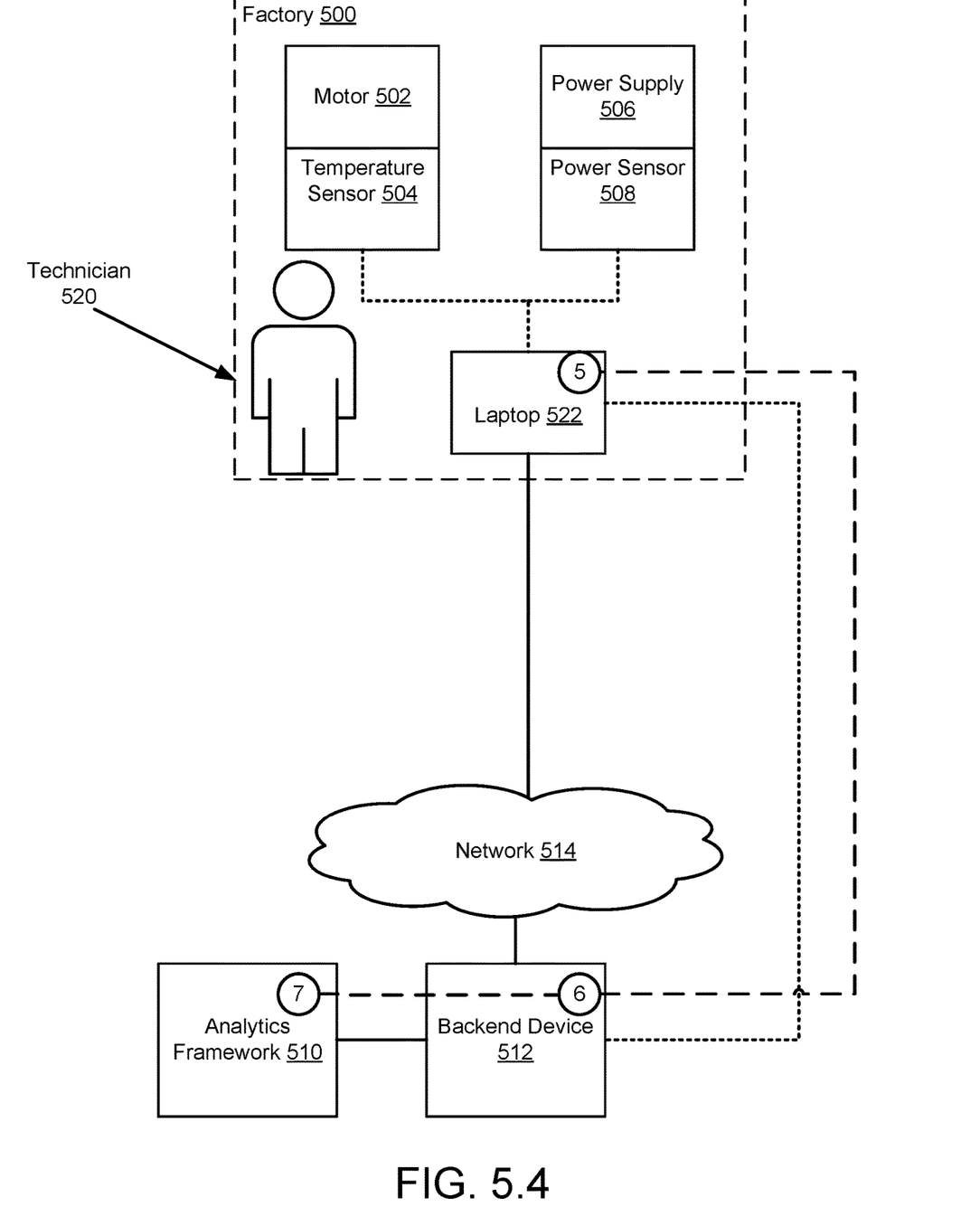

Additionally, to perform the schedule services, the technician (520) starts up the VDI hosted by the laptop (522) which, in turn, established a VDI connection (630) between the laptop (522) and backend device (512), respectively. The VDI connection (630) is established for graphics purposes (e.g., to display a desktop of an operating system executing on the backend device (512)). For simplicity, in FIGS. 5.3 and 5.4, the labels for the wireless connection (520) and VDI connection (630) are removed.

Turning to FIG. 5.3, the technician (520) invokes a factory testing function on the laptop (522) which causes, at step 1, the temperature sensor (504) to send temperature measurements to the laptop (522). At step 2, the laptop (522) stores the temperature measurements in an edge data repository.

Similarly, at step 3, the factory testing function causes the power sensor (508) to begin sending power consumption measurements to the laptop (522). At step 4, the laptop (522) stores the power consumption measurements in the edge data repository.

To ascertain whether the factory (500) is producing product appropriately, the laptop (522) determines that it needs to process the stored unprocessed edge data (i.e., the temperature measurements and power consumption measurements). To do so, it repurposes the VDI connection (630) for data transmission purposes rather than graphics purposes. Consequently, the laptop (522) is able to transmit the unprocessed edge data to the backend device (512) without needing to open another connection.

Turning to FIG. 5.4, at step 5, the laptop (522) transmits messages to the backend device (512) via the repurposed VDI connection. The messages include the unprocessed edge data.

At step 6, the backend device (512) identifies the presence of the unprocessed edge data in the messages and forward the unprocessed edge data to the analytics framework (510). At step 7, the analytics framework (510) processes the unprocessed edge data. The processing indicates that the motor (502) is operating nominally. Consequently, the technician (520) is able to leave the factory (500) without needing to alter the operation of any of its components.

End of Example

Figure 6:
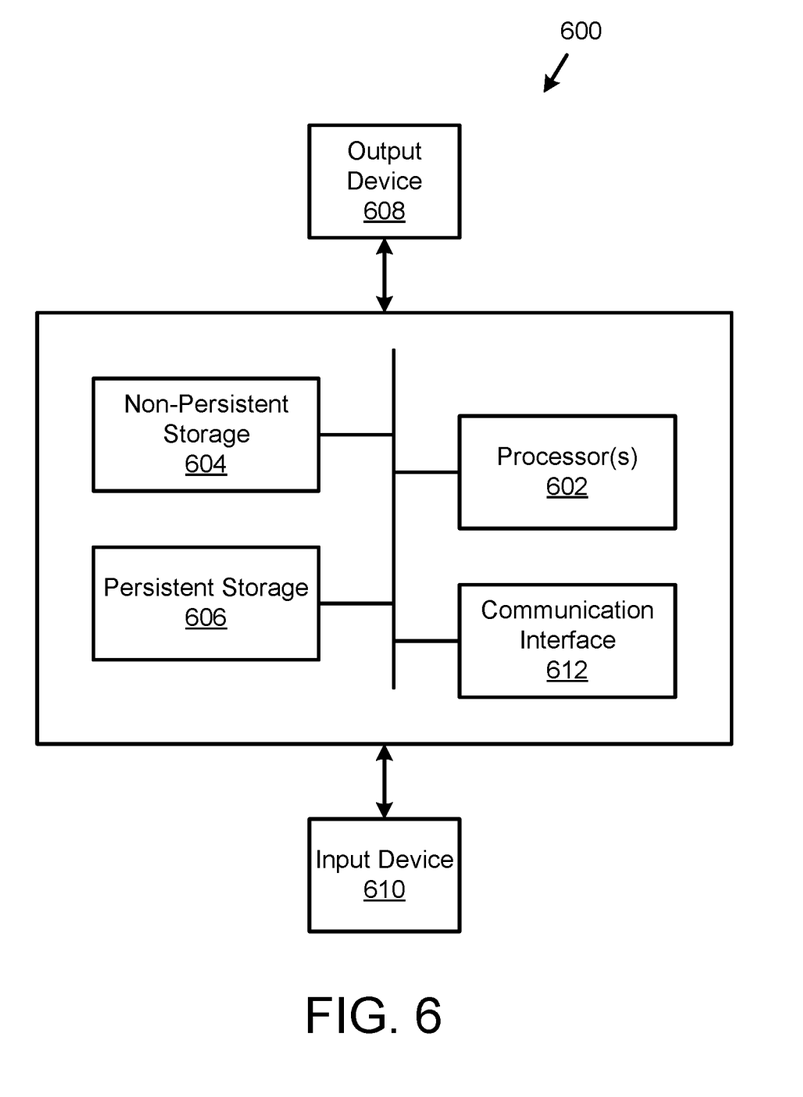
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for managing distributed processing of data in a distributed computing environment. Specifically, embodiments of the invention may repurpose existing connections used for predetermined purposes to distribute the to-be-processed data and execute processing of the distributed data. By doing so, the system may more efficiently marshal limited computing resources to perform distributed data processing by avoiding the overhead associated with opening additional connections for data transmission and orchestration purposes.

Thus, embodiments of the invention may address the problem of limited computing resources. For example, by utilizing existing rather than new connections, devices that may not otherwise be able to appropriately provide their respective functionalities as well as distribute and orchestrate processing of data may provide such functionality.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An edge device for distributed processing of unprocessed edge data from any number of edge data collection devices using an analytics framework, comprising:
   a storage device for storing the unprocessed edge data; and
   a processor programmed to:
      obtain the unprocessed edge data from an edge data collection device of the edge data collection devices;
      identify a processing modality for the unprocessed edge data;
      process the unprocessed edge data based on the processing modality, comprising:
         identifying a first portion of the unprocessed edge data to be processed by the edge device;
         identifying a second portion of the unprocessed edge data to be processed by the analytics framework, wherein the second portion comprises sensor data from the edge data collection device;
         processing the first portion of the unprocessed edge data to obtain a first partial processed edge data result;
         repurposing a virtualized desktop infrastructure (VDI) connection between the edge device and a backend device operably connected to the analytics framework for data transfer purposes to obtain a repurposed VDI connection, wherein the VDI connection was originally established to display, on the edge device, a desktop of an operating system executing on the backend device;
         providing a message comprising an identifier and the second portion of the unprocessed edge data to the analytics framework for processing purposes, using, at least in part, the repurposed VDI connection, wherein the identifier indicates that the message includes the second portion of the unprocessed edge data and that the second portion of the unprocessed edge data is meant for processing by the analytics framework; and
         obtaining a second partial processed edge data result from the analytics framework via the repurposed VDI connection;
         combining the first partial processed edge data result with the second partial processed edge data result to obtain a complete processed edge data result; and
      provide a computer implemented service using the complete processed edge data result.

2. The edge device of claim 1, wherein providing the computer implemented service comprises:
   performing an action set based on the complete processed edge data result.

3. The edge device of claim 2, wherein the action set comprises:
   collecting second unprocessed edge data from one of the any number of edge data collection devices; and
   processing the collected second unprocessed edge data.

4. The edge device of claim 1, wherein repurposing the VDI connection comprises instantiating a virtual channel between the edge device and the analytic framework using the VDI connection.

5. The edge device of claim 1, wherein the edge device comprises a portable computing device operably connectable to the edge data collection devices when the edge device is in proximity to the edge data collection devices.

6. The edge device of claim 5, wherein the edge data collection device comprise fixed location sensors disposed at predetermined locations.

7. The edge device of claim 1, wherein the processing modality specifies how the unprocessed edge data is distributed between the edge device, the backend device, and the analytic framework for processing purposes.

8. The edge device of claim 1, wherein the processing modality is identified based on processing resources of the edge device, the backend device, and the analytic framework.

9. A method for distributed processing of unprocessed edge data from any number of edge data collection devices using an analytics framework, comprising:
  obtaining, by an edge device, the unprocessed edge data from an edge data collection device of the edge data collection devices;
  identifying a processing modality for the unprocessed edge data;
  processing the unprocessed edge data based on the processing modality, comprising:
    identifying a first portion of the unprocessed edge data to be processed by the edge device;
    identifying a second portion of the unprocessed edge data to be processed by the analytics framework, wherein the second portion comprises sensor data from the edge data collection device;
    processing the first portion of the unprocessed edge data to obtain a first partial processed edge data result;
    repurposing a virtualized desktop infrastructure (VDI) connection between the edge device and a backend device operably connected to the analytics framework for data transfer purposes to obtain a repurposed VDI connection, wherein the VDI connection was originally established to display, on the edge device, a desktop of an operating system executing on the backend device;
    providing a message comprising an identifier and the second portion of the unprocessed edge data to the analytics framework for processing purposes, using, at least in part, the repurposed VDI connection, wherein the identifier indicates that the message includes the second portion of the unprocessed edge data and that the second portion of the unprocessed edge data is meant for processing by the analytics framework; and
    obtaining a second partial processed edge data result from the analytics framework via the repurposed VDI connection;
    combining the first partial processed edge data result with the second partial processed edge data result to obtain a complete processed edge data result; and
  providing a computer implemented service using the complete processed edge data result.

10. The method of claim 9, wherein providing the computer implemented service comprises:
  performing an action set based on the complete processed edge data result.

11. The method of claim 10, wherein the action set comprises:
  collecting second unprocessed edge data from one of the any number of edge data collection devices; and
  processing the collected second unprocessed edge data.

12. A non-transitory computer readable medium comprising computer readable program code, which when executed by a computer processor enables the computer processor to perform a method for distributed processing of unprocessed edge data from any number of edge data collection devices using an analytics framework, the method comprising:
  obtaining, by an edge device, the unprocessed edge data from an edge data collection device of the edge data collection devices;
  identifying a processing modality for the unprocessed edge data;
  processing the unprocessed edge data based on the processing modality, comprising:
    identifying a first portion of the unprocessed edge data to be processed by the edge device;
    identifying a second portion of the unprocessed edge data to be processed by the analytics framework, wherein the second portion comprises sensor data from the edge data collection device;
    processing the first portion of the unprocessed edge data to obtain a first partial processed edge data result;
    repurposing a virtualized desktop infrastructure (VDI) connection between the edge device and a backend device operably connected to the analytics framework for data transfer purposes to obtain a repurposed VDI connection, wherein the VDI connection was originally established to display, on the edge device, a desktop of an operating system executing on the backend device;
    providing a message containing an identifier and the second portion of the unprocessed edge data to the analytics framework for processing purposes, using, at least in part, the repurposed VDI connection, wherein the identifier indicates that the message includes the second portion of the unprocessed edge data and that the second portion of the unprocessed edge data is meant for processing by the analytics framework; and
    obtaining a second partial processed edge data result from the analytics framework via the repurposed VDI connection;
    combining the first partial processed edge data result with the second partial processed edge data result to obtain a complete processed edge data result; and
  providing a computer implemented service using the complete processed edge data result.

13. The non-transitory computer readable medium of claim 12,
  wherein providing the computer implemented service comprises:
    performing an action set based on the complete processed edge data result.

14. The non-transitory computer readable medium of claim 13, wherein the action set comprises:
  collecting second unprocessed edge data from one of the any number of edge data collection devices; and
  processing the collected second unprocessed edge data.

* * * * *